UNITED STATES PATENT OFFICE.

WALTER PETHYBRIDGE, OF LONDON, ENGLAND.

TREATMENT OF TELLURIDE GOLD ORES.

SPECIFICATION forming part of Letters Patent No. 709,037, dated September 16, 1902.

Application filed August 19, 1901. Serial No. 72,500. (No specimens.)

*To all whom it may concern:*

Be it known that I, WALTER PETHYBRIDGE, a subject of the King of Great Britain and Ireland, residing at London, England, have invented a new and useful Improvement in the Treatment of Telluride Gold Ores, (for which I have made application for Letters Patent in Great Britain under No. 1,738 and date January 25, 1901,) of which the following is a specification.

The processes hitherto in practice or proposed for the treatment of telluride gold ores have been open to various objections—viz., costliness of working and an unsatisfactory yield of gold.

The object of my present invention is to treat the said ores in an economical manner with the recovery of all or practically all the gold contained therein.

According to my invention I subject the ore in a fine state of division to the action of a solution of ferric chlorid, which may preferably be of a specific density of 1.18. The reaction will occur at any temperature; but the greater the degree of heat up to boiling-point in the solution the more expeditiously will the process be effected. I add the ore, preferably gradually, to the solution, which should be continually agitated in vats or other suitable containing vessels by stirrers or other means, and the addition of ore may be continued to the solution until the latter has changed its color from a yellow brown to green, which latter is a sign that the ferric chlorid has become ferrous chlorid with simultaneous formation of tellurium tetrachlorid. The reaction between the solution of ferric chlorid and the tellurium in a usual ore, such as sylvanite, may be represented as follows:

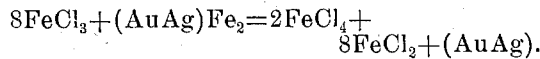
$$8FeCl_3 + (AuAg)Fe_2 = 2FeCl_4 + 8FeCl_2 + (AuAg).$$

By this means the telluride of gold is decomposed and the tellurium passes into solution with possibly some silver, if present, while the gold is left behind in a free or uncombined state and with silver, if present. The residues are then separated from the solution by filtration or decantation, and after being thoroughly washed the said residues may be subjected to amalgamation, chlorination, or cyanidation in known manner for the recovery of the gold contained therein. The tellurium may be precipitated from the solution when necessary by means of metallic iron in the form of scrap and by boiling, the tellurium being displaced from the tellurium tetrachlorid by the iron, producing ferrous chlorid, the tellurium being precipitated as a black powder. The solution is then filtered, and the filtrate, consisting of ferrous chlorid, may be converted into ferric chlorid for further use on fresh charges of ore by means of any suitable oxidizing process, such as by the addition of potassium chlorate, or, preferably, with hydrochloric acid, or by potassium nitrate, or by electrolysis. The former reaction may be expressed thus, as an example:

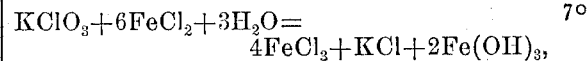
$$KClO_3 + 6FeCl_2 + 3H_2O = 4FeCl_3 + KCl + 2Fe(OH)_3,$$

or better

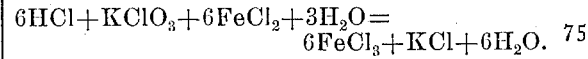
$$6HCl + KClO_3 + 6FeCl_2 + 3H_2O = 6FeCl_3 + KCl + 6H_2O.$$

As this conversion is more rapidly carried out at approximately boiling temperature and this temperature is also useful, as aforesaid, for obtaining the decomposition of telluride of gold in fresh ore, I find it most economical to add the spent ferrous chlorid from a former reaction to fresh ore and when raised to approximately boiling temperature to then convert the ferrous chlorid into ferric chlorid *in situ* in the vat with the fresh ore by the addition of potassium chlorate or nitrate or by electrolysis, as above stated, utilizing the same heat for reconversion of the ferrous chlorid firstly and secondly for the decomposition of the telluride of gold. Should it be desired to bring the gold together with the tellurium into solution, this may be easily done by effecting the chlorination of the gold by generating free chlorid in the solution after the latter is or has become ferric chlorid. This may be done in manner well known by adding potassium chlorate and hydrochloric acid or hypochlorite of lime and hydrochloric acid to the solution in an amount in excess of that which is necessary to convert the ferrous chlorid into ferric chlorid, if the latter reaction is first required. The gold and tellurium are now in solution together and their separation may be effected as hereinafter described with regard to oxidized ores. In the case of oxidized ores where iron is present I may employ hydrochloric acid and water, whereby the ferric chlorid necessary for the subsequent decomposition of the telluride of gold is formed from the iron present in the ore. At this stage of the process, taking care that the hydrochloric acid is in excess, the addition of chlorate of potassium or hypochlorite of lime, as above mentioned, will generate free chlorin, thus decomposing the telluride of gold with both the tellurium and the gold in solution. The separation of the tellurium and gold in joint solution after removal of the tailings by decantation or filtration may be effected by precipitating the whole of the gold and tellurium and silver, if present, by means of metallic iron or zinc, which will replace the gold and tellurium in the chlorid solution. By filtering the residue, which is a mixed powder of gold and tellurium and silver, if present, the tellurium and silver may be dissolved therefrom by nitric acid, leaving the gold behind in a fine powder, which is then washed, dried, and melted, or alternatively the gold may be precipitated from the mixed solution by means of ferrous sulfate, which does not react upon the tellurium or silver, if present. The precipitated gold may be filtered, dried, and melted into bars.

Having now particularly described this invention, what I claim, and desire to secure by Letters Patent, is—

1. A process for the decomposition of ores containing telluride of gold, consisting in reducing the ore to a finely-divided state, then exposing the ore to the action of a solution of ferric chlorid of a specific density of about 1.18, and continuing the treatment until the tellurium is in solution.

2. In the decomposition of ores containing telluride of gold, the process of reducing the ore to a finely-divided state and then exposing the ore to the action of a solution of ferric chlorid, alone, to attack the tellurium.

3. In the decomposition of ores containing telluride of gold, the process of reducing the ore to a finely-divided state and then exposing the ore to the action of a heated and agitated solution of ferric chlorid, alone, to attack the tellurium.

4. In the decomposition of ores containing telluride of gold together with iron, the process of reducing the ore to a finely-divided state, treating the ore with hydrochloric acid and water to form ferric chlorid in solution, and then decomposing the telluride of gold by means of such ferric chlorid.

In witness whereof I have hereunto set my hand in presence of two witnesses.

WALTER PETHYBRIDGE.

Witnesses:
REGINALD WILLIAM JAMES,
RICHARD A. HOFFMANN.